(12) United States Patent
Rajagopalan et al.

(10) Patent No.: US 10,382,528 B2
(45) Date of Patent: Aug. 13, 2019

(54) DISPOSITION ACTIONS IN DIGITAL ASSET MANAGEMENT BASED ON TRIGGER EVENTS

(71) Applicant: Microsoft Technology Licensing, LLC, Redmond, WA (US)

(72) Inventors: Rajmohan Rajagopalan, Sammamish, WA (US); Michael Stokes, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 531 days.

(21) Appl. No.: 14/723,160

(22) Filed: May 27, 2015

(65) Prior Publication Data

US 2016/0261682 A1 Sep. 8, 2016

Related U.S. Application Data

(60) Provisional application No. 62/128,883, filed on Mar. 5, 2015.

(51) Int. Cl.
*H04L 29/08* (2006.01)
*G06Q 10/10* (2012.01)
*G06Q 50/00* (2012.01)

(52) U.S. Cl.
CPC ............ *H04L 67/10* (2013.01); *G06Q 10/10* (2013.01); *G06Q 50/01* (2013.01); *H04L 67/025* (2013.01)

(58) Field of Classification Search
CPC ....... H04L 67/10; H04L 67/025; H04L 29/08; G06Q 50/01; G06Q 10/10
USPC .................. 709/204; 713/165, 168; 726/4, 6
See application file for complete search history.

(56) References Cited

U.S. PATENT DOCUMENTS

| 6,430,542 B1 | 8/2002 | Moran |
| 6,970,836 B1 | 11/2005 | Paltenghe et al. |
| 7,716,732 B2 | 5/2010 | Dodson et al. |
| 8,396,838 B2 | 3/2013 | Brockway et al. |

(Continued)

FOREIGN PATENT DOCUMENTS

| JP | 2008234341 A | 10/2008 |
| WO | 2005119992 A1 | 12/2005 |
| WO | 2013170374 A1 | 11/2013 |

OTHER PUBLICATIONS

"International Search Report and Written Opinion Issued in PCT Application No. PCT/US2016/020145", dated Jun. 9, 2016, 12 Pages.

(Continued)

*Primary Examiner* — Ashokkumar B Patel
*Assistant Examiner* — Quazi Farooqui
(74) *Attorney, Agent, or Firm* — Michael Best & Friedrich LLP

(57) ABSTRACT

Digital asset management with disposition actions based on trigger events are provided. A management service transmits actions to an asset manager to prompt the asset manager to customize the actions. The actions include operations to dispose of digital assets of an asset owner based on a detection of a trigger event. The management service detects a customization and/or a selection of a subset of the actions by the asset manager and monitors the digital assets to detect the trigger event. Once the management service detects the trigger event, the management service executes the subset of the actions to dispose of the digital assets.

19 Claims, 7 Drawing Sheets

(56) References Cited

U.S. PATENT DOCUMENTS

| | | | |
|---|---|---|---|
| 8,538,966 | B2 | 9/2013 | Reese et al. |
| 9,286,316 | B2 | 3/2016 | Faitelson et al. |
| 9,298,927 | B2 | 3/2016 | Lietz et al. |
| 9,584,314 | B2 | 2/2017 | Bajekal et al. |
| 9,805,050 | B2* | 10/2017 | Smith .................. G06F 16/178 |
| 10,007,714 | B2 | 6/2018 | Rajagopalan et al. |
| 2002/0111946 | A1 | 8/2002 | Fallon |
| 2003/0182290 | A1 | 9/2003 | Parker |
| 2006/0218148 | A1 | 9/2006 | Weber et al. |
| 2007/0192114 | A1 | 8/2007 | Parpala |
| 2010/0063908 | A1 | 3/2010 | Racanelli et al. |
| 2010/0180349 | A1 | 7/2010 | Koohgoli et al. |
| 2012/0016803 | A1 | 1/2012 | Tharp |
| 2012/0047055 | A1 | 2/2012 | Aiello |
| 2013/0031176 | A1 | 1/2013 | Shih et al. |
| 2013/0054780 | A1 | 2/2013 | Bade et al. |
| 2013/0110922 | A1 | 5/2013 | Shih et al. |
| 2013/0144960 | A1 | 6/2013 | Salamat |
| 2013/0238893 | A1 | 9/2013 | Henderson |
| 2013/0262514 | A1 | 10/2013 | Everett et al. |
| 2013/0325976 | A1 | 12/2013 | Mansfield et al. |
| 2014/0025591 | A1 | 1/2014 | Villa |
| 2014/0136591 | A1* | 5/2014 | Hoberman ............ H04L 67/306 709/201 |
| 2014/0136619 | A1 | 5/2014 | Hoberman |
| 2014/0143106 | A1 | 5/2014 | Fox |
| 2014/0181928 | A1 | 6/2014 | Bergman et al. |
| 2014/0279079 | A1 | 9/2014 | Gudorf et al. |
| 2015/0242814 | A1* | 8/2015 | Saad .................... G06Q 10/107 705/312 |
| 2015/0304343 | A1 | 10/2015 | Cabrera et al. |
| 2016/0125068 | A1 | 5/2016 | Dongieux |
| 2016/0182240 | A1 | 6/2016 | Nayshtut et al. |
| 2016/0259835 | A1 | 9/2016 | Rajagopalan et al. |
| 2016/0260187 | A1 | 9/2016 | Rajagopalan et al. |
| 2016/0261635 | A1 | 9/2016 | Rajagopalan et al. |

OTHER PUBLICATIONS

"Second Written Opinion Received for PCT Application No. PCT/US2016/020145", dated Jan. 31, 2017, 7 Pages.
"International Preliminary Report on Patentability Issued in PCT Application No. PCT/US2016/020145", dated May 24, 2017, 8 Pages.
"International Search Report and Written Opinion Issued in PCT Application No. PCT/US2016/020306", dated May 24, 2016, 12 Pages.
"Second Written Opinion Issued in PCT Application No. PCT/US2016/020306", dated Jan. 31, 2017, 7 Pages.
Desmarais, Christina, "Manage What Happens to Your Online Accounts After You Die", Published on: Aug. 25, 2014 Available at: http://www.techlicious.com/how-to/how-to-manage-your-online-accounts-after-you-die/.
Callison-Burch, et al., "Adding a Legacy Contact", Published on: Feb. 12, 2015 Available at: https://newsroom.fb.com/news/2015/02/adding-a-legacy-contact/.
Rosen, Rebecca J., "Google Death: A Tool to Take Care of Your Gmail When You're Gone", Published on: Apr. 12, 2013 Available at: http://www.theatlantic.com/technology/archive/2013/04/google-death-a-tool-to-take-care-of-your-gmail-when-youre-gone/274934/.
"Handling Your Digital Presence After Death", Retrieved on: Apr. 20, 2015 Available at: http://www.jardinefuneralhome.com/mysendoff/story/handling-your-digital-presence-after-death.
Romero, Ric, "Social Media, Digital Presence after Death", Published on: Aug. 28, 2013 Available at: http://abc7.com/archive/9221031/.
Kishore, Aseem, "OTT Guide to Securing Your Digital Life After Death", Published on: Jan. 30, 2014 Available at: http://www.online-tech-tips.com/computer-tips/ott-guide-securing-digital-life-death/.

Swallow, Eric, "7 Resources for Handling Digital Life After Death", Published on: Oct. 11, 2010 Available at: http://mashable.com/2010/10/11/social-media-after-death/.
"How to Protect Your Digital Footprint", Retrieved from: https://web.archive.org/web/20160103190959/https://www.planneddeparture.com/news/How-to-protect-your-digital-footprint, Retrieved Date: Mar. 17, 2015, 2 Pages.
"PasswordBox", Retrieved from: https://web.archive.org/web/20140702005559/https://www.passwordbox.com/legacylocker, Feb., 2014, 2 Pages.
"Planned Departure", Retrieved From: https://web.archive.org/web/20150721071219/https://www.planneddeparture.com/how, Retrieved Date: Apr. 17, 2015, 2 Pages.
"Principled Heart", Retrieved from: https://web.archive.org/web/20131127161525/http://www.principledheart.com/how-it-works/, Sep. 26, 2013, 3 Pages.
"The Deathswitch", Retrieved from: https://web.archive.org/web/20150320060928/http://deathswitch.com/, Retrieved Date: Apr. 17, 2015, 4 Pages.
"The Digital Beyond", Retrieved from: http://www.thedigitalbeyond.com/online-services-list/, Feb. 3, 2015, 14 Pages.
"Final Office Action Issued in U.S. Appl. No. 14/721,079", dated Jun. 15, 2018, 8 Pages.
"Non Final Office Action Issued in U.S. Appl. No. 14/721,079", dated Nov. 16, 2017, 24 Pages.
"Non Final Office Action Issued in U.S. Appl. No. 14/722,250", dated Aug. 9, 2017, 18 Pages.
"Final Office Action Issued in U.S. Appl. No. 14/723,104", dated Jun. 1, 2018, 29 Pages.
"Final Office Action Issued in U.S. Appl. No. 14/723,104", dated Mar. 15, 2017, 26 Pages.
"Non Final Office Action Issued in U.S. Appl. No. 14/723,104", dated Jul. 7, 2017, 17 Pages.
"Non Final Office Action Issued in U.S. Appl. No. 14/723,104", dated Dec. 11, 2017, 31 Pages.
"Non Final Office Action Issued in U.S. Appl. No. 14/723,104", dated Dec. 5, 2016, 30 Pages.
"Office Action Issued in European Patent Application No. 16709236.0", dated Oct. 2, 2018, 11 Pages.
"Provisional Application Filed in U.S. Appl. No. 62/128,883", filed Mar. 5, 2015, 28 Pages.
Carroll, Evan, "How to Manage your Digital Assets", Retrieved from: https://web.archive.org/web/20141023061431/https://www.passare.com/sites/default/files/How-to%20Manage%20Your%20Digital%20Assets.pdf, Retrieved Date: Mar. 17, 2015, 16 Pages.
Genders, Rod, "The Digital Museum", Retrieved from: https://www.step.org/journal/step-joumal-december-2013-january-2014/digital-museum, Dec. 2013, 4 Pages.
Kumar, Arun, "Digital Assets Management: What Happens to Your Online Accounts After You Die", Retrieved from: https://www.thewindowsclub.com/digital-assets-management, Apr. 4, 2014, 6 Pages.
Kutler, Noam, "Protecting Your Online You: A New Approach to Handling Your Online Persona After Death", In Proceedings of Berkeley Technology Law Journal, vol. 26, Issue 4, Sep. 2011, 1 Page.
Laise, Eleanor, "Protect Digital Assets After Your Death", Retrieved from: https://www.kiplinger.com/article/retirement/T021-C000-S004-protect-digital-assets-after-your-death.html, May 2013, 4 Pages.
"International Preliminary Report on Patentability Issued in PCT Application No. PCT/US2016/020151", dated May 24, 2017, 8 Pages.
"International Search Report and Written Opinion Issued in PCT Application No. PCT/US2016/020151", dated May 24, 2016, 12 Pages.
"Second Written Opinion Issued in PCT Application No. PCT/US2016/020151", dated Jan. 31, 2017, 7 Pages.
"International Preliminary Report on Patentability Issued in PCT Application No. PCT/US2016/020305", dated May 24, 2017, 8 Pages.
"International Search Report and Written Opinion Issued in PCT Application No. PCT/US2016/020305", dated May 20, 2016, 12 Pages.

(56) References Cited

OTHER PUBLICATIONS

"Second Written Opinion Received for PCT Application No. PCT/US2016/020305", dated Jan. 31, 2017, 7 Pages.

"International Preliminary Report on Patentability Issued in PCT Application No. PCT/US2016/020306", dated May 24, 2017, 8 Pages.

Redrup, Yolanda, "Death, Data and the Internet: Managing your Assets in the Digital Sphere", In Proceedings of Private Media, Oct. 15, 2013, 3 Pages.

Tuerk, Andreas, "Plan Your Digital Afterlife with Inactive Account Manager", Retrieved from: https://publicpolicy.googleblog.com/2013/04/plan-your-digital-afterlife-with.html, Apr. 11, 2013, 17 Pages.

* cited by examiner ially described above, disposition actions in digital
DISPOSITION ACTIONS IN DIGITAL ASSET MANAGEMENT BASED ON TRIGGER EVENTS

CROSS-REFERENCE TO RELATED APPLICATION

This Application claims priority under 35 U.S.C. § 119(e) to U.S. Provisional Patent Application Ser. No. 62/128,883 filed on Mar. 5, 2015. The disclosure of the U.S. Provisional Patent Application is hereby incorporated by reference in its entirety.

BACKGROUND

The proliferation of computerized automation of processes in every aspect of life, data storage and processing have become a major component of networked systems handling social interactions. In such systems, social data is entered, modified, or deleted from a number of sources. Various social data stores from simple tables to complicated databases are maintained and synchronized as new entries or modifications are made by different sources. In addition, variety of services are offered to enable internal and external parties' interactivity with the social data hosted by the data stores. Incapacitation events associated with an owner of the social data present significant challenges in management and disposition of the social data.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to performing digital asset management with disposition actions based on trigger events. In some example embodiments, a management service may transmit actions to an asset manager to prompt the asset manager to customize the actions. The actions may include operations to dispose of the digital assets in response to the detection of the trigger event. A customization and a selection of a subset of the by the asset manager may be detected. The digital assets may be monitored to detect a trigger event. An indication of the detection of the trigger event may be received from the monitoring engine. The subset of the actions to dispose of the digital assets may be executed.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
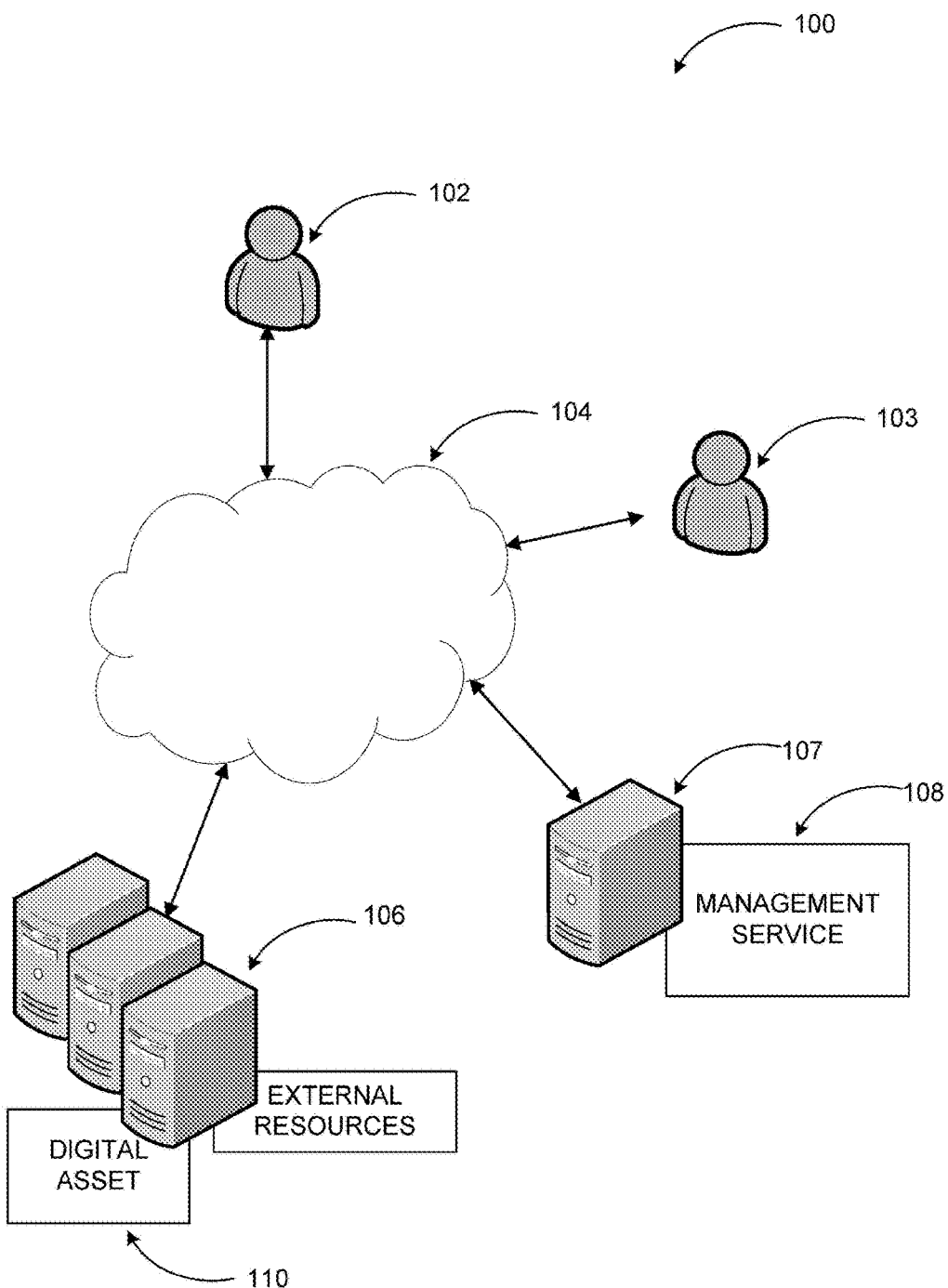
FIG. 1 is a conceptual diagram illustrating an example management service configured to perform digital asset management with disposition actions based on trigger events, according to embodiments.

As briefly described above, disposition actions in digital asset management may be performed based on trigger events by a management service in examples. The management service may transmit actions to an asset manager to prompt the asset manager to customize the actions. The disposition actions may include operations to dispose of the digital assets of an asset owner in response to a detection of trigger event. A customization and a selection of a subset of the actions by the asset manager may be detected. The digital assets may be monitored to detect the trigger event. In response to a detection of the trigger event, the subset of the actions may be executed.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, and a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to perform digital asset management with disposition actions based on trigger events. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience is a visual display associated with an application or service through which a user interacts with the application or service. A user action refers to an interaction between a user and the user experience of an application or the user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 is a conceptual diagram illustrating an example management service configured to perform digital asset management with disposition actions based on trigger events, according to at least some embodiments disclosed herein.

As disclosed in a diagram 100, a computing device 107 may execute a management service 108 that manages actions to dispose of digital assets of an asset owner 102. The computing device 107 may include a hardware server, a desktop computer, a notebook computer, among others. The management service 108 may provide services that include, among other similar devices. An example of the management service 108 may include a management application that provides information and data processing functionality. The management service 108 may also provide a client user interface (UI) to an asset owner 102 to allow the asset owner to configure operations associated with disposal of a digital asset 110 associated with the asset owner 102. The digital asset 110 may be hosted by external resources 106.

The management service 108 may include various modules (e.g. a policy engine and a monitoring engine) configured to facilitate discovery of the digital asset 110. In an example scenario, the management service 108 may receive a request for a subscription from the asset owner 102. In response to the request for the subscription, the modules of the management service 108 may search for the digital asset 110 from the external resources 106.

The digital asset 110 may include information associated with accounts of the asset owner 102, and content associated with the asset owner 102, and among others. The management service 108 may store information associated with the digital asset 110 at a local storage or at a trusted remote storage.

The digital asset 110 may also include, among others, stored data, a social networking presence, a professional networking presence, financial data, financial accounts, and an online gaming presence. The stored data may include, among other things, documents, images, audio files, and video files. The social networking presence and/or the professional networking presence may include accounts, blogs, and postings.

The management service 108 may be configured to present suggested actions to an asset manager. The suggested actions may include operations to dispose of the digital assets 110 of the asset owner 102 in response to a detection of a trigger event. In some examples, the asset owner 102 may identify a legal representative of the asset owner 102, an authorized family member of the asset owner 102, an authorized relation of the asset owner 102, and a colleague of the asset owner 102 as an asset manager 103. The asset owner 102, the legal representative, the authorized family member, the authorized relation, or the colleague may also be identified as the asset manager 103.

Figure 2:
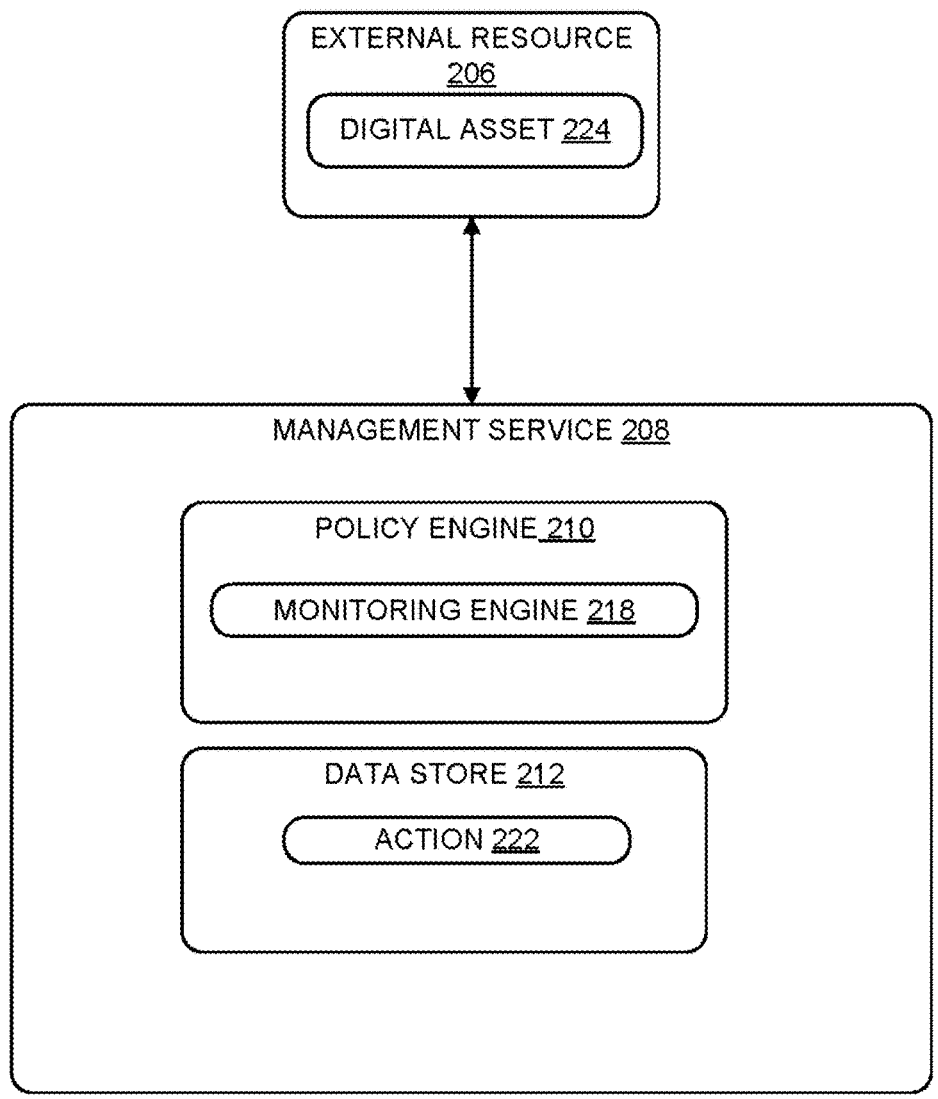
FIG. 2 illustrates example interactions between external resources and a management service, the management service performing digital asset management with disposition actions based on trigger events, according to embodiments.

The management service 108 may monitor a content the digital asset 110 to identify a trigger event to execute actions to dispose of the digital asset 110. The trigger event may include, among others, an inactivity by the asset owner 102 during a period of time, a death of the asset owner 102, a disablement of the asset owner 102, an expatriation of the asset owner 102, the asset owner 102 entering into a witness protection program, an indication of a stolen identity of the asset owner 102, a name change of the asset owner 102, a permanent relocation of the asset owner 102, an imprisonment of the asset owner 102, and a legal incapacitation declaration associated with the asset owner 102, among others. In response to a detection of the trigger event, the management service 108 may execute the actions to dispose of the digital asset 110. The above-described modules of the management service 108 may be implemented as software, hardware, or combinations thereof FIG. 2 illustrates example interactions between external resources and a management service, the management service performing digital asset management with disposition actions based on trigger events, according to at least some embodiments disclosed herein.

As illustrated in a block diagram 200, a management service 208 may have components such as a policy engine 210 and a data store 212. The policy engine 210 may include a monitoring engine 218. The monitoring engine 218 may be a component of the policy engine 210. Alternatively, the monitoring engine 218 may be stand-alone components of the management service 208.

The management service 208 may receive a subscription request from an asset owner. In response to the subscription request, the monitoring engine 218 may perform a discovery process to search for information provided by the asset owner, search for an online presence associated with the asset owner, and locate a digital asset 224 associated with the asset owner. In an example scenario, the policy engine 210 may identify the digital asset 224 associated with the asset owner hosted by an external resource 206.

The action 222 to dispose of the digital asset 224 may be stored in the data store 212, among other default actions. The digital asset 224 may be matched the action 222 from a set of default actions. The action 222 may describe operations to dispose of the digital asset 224.

A directed input by the asset manager into the management service 208 may be identified as the trigger event. The directed input may instruct the management service 208 to execute the actions to dispose of the digital asset 224. The monitoring service 208 may further detect the trigger events through online searches of the external resource 206. Online searches may discover legal declarations and news associated with the asset owner hosted by the external resource 206. The legal declarations and news may be analyzed to detect the trigger event. The trigger event may include, among others, an inactivity by the asset owner during a period of time, a death of the asset owner, a disablement of the asset owner, an expatriation of the asset owner, the asset owner entering into a witness protection program, an indication of a stolen identity of the asset owner, a name change of the asset owner, a permanent relocation of the asset owner, an imprisonment of the asset owner, and a legal incapacitation declaration associated with the asset owner, among others. In some examples, legal jurisdictions may be taken into consideration. Depending on laws governing disposition of the digital assets 224, the asset manager may be presented with different options and may decide to move and/or locate the digital asset 224 into different legal jurisdictions.

The policy engine 210 may also transmit the digital asset 224 or the trigger event associated with the digital asset 224 to the asset manager to confirm a validity of the digital asset 224 or the trigger event. In response to a confirmation of the digital asset 224 or the trigger event, the management service 208 may transmit a list of suggested actions to be performed on the digital asset 224 to the asset manager to allow the asset manager to select or customize the suggested actions.

The management service 208 may also categorize the digital assets 224 based on one or more of an asset type, an asset attribute, and an attribute of the asset owner. The management service 208 may also detect changes to the digital asset 224. The changes may include, for example, a detection of a new online service account, a detection of a closure of an online service account, a move of online data from one cloud storage to another, among others performed by the asset owner.

In some examples, the changes may necessitate a review or a revision of the categories or the action 222 associated the digital asset 224. The action 222 may describe operations to dispose of the digital assets 224. The operations may include a forward operation to transmit the digital asset 224 to the asset manager. The operations may also include a deletion operation to delete the digital assets 224.

Some operations may be repeated or iteratively performed. Depending on a source (e.g. the internal service 202 and/or the external resource 206) and type of information collected, different operations may be performed.

Figure 3:
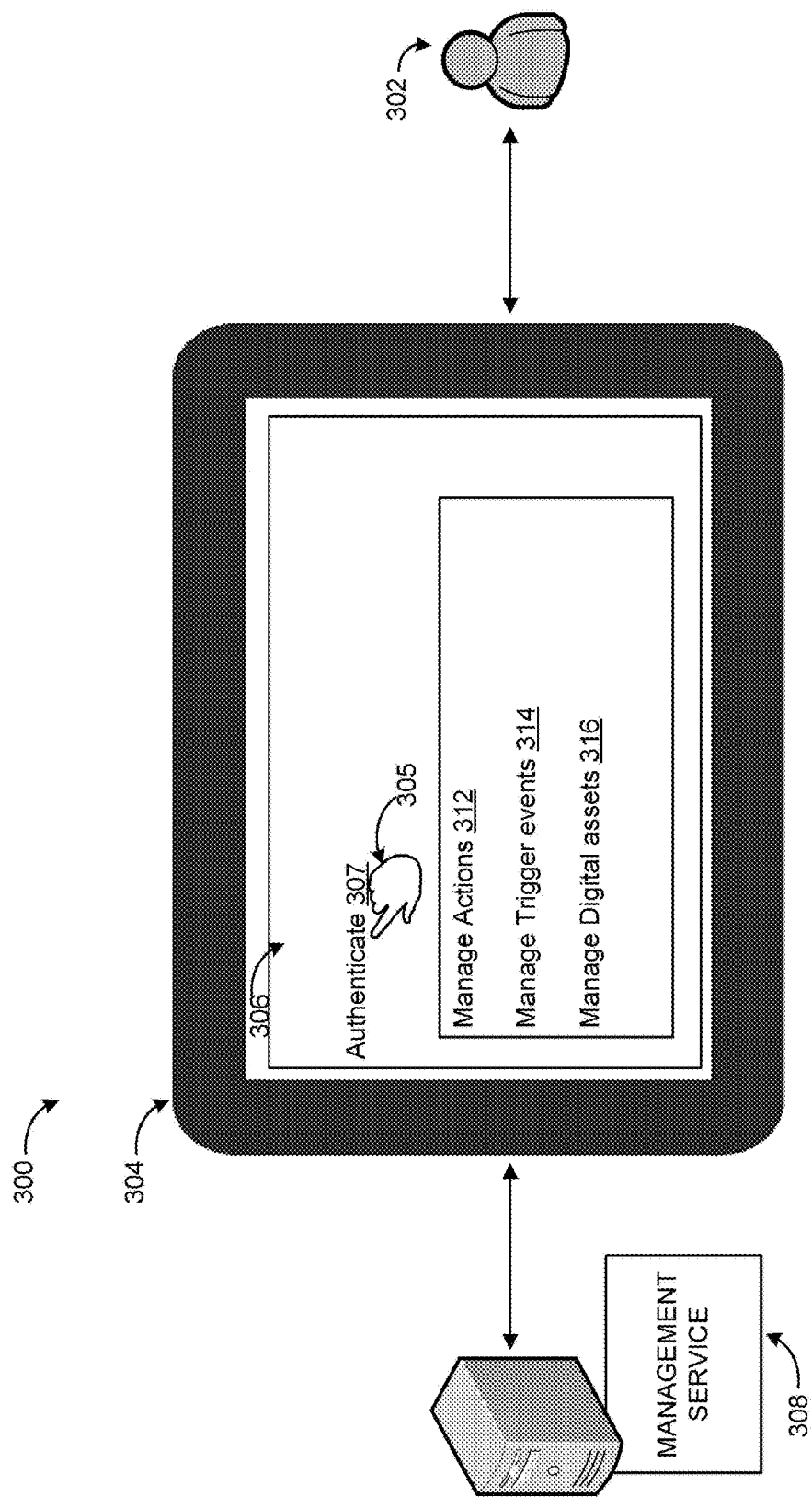
FIG. 3 illustrates an example client user interface of a management service configured to perform digital asset management with disposition actions based on trigger events, according to embodiments.

FIG. 3 illustrates an example client user interface of a management service configured to perform digital asset management with disposition actions based on trigger events, according to at least some embodiments disclosed herein.

In a diagram 300, a management service 308 may provide a client UI 306 on a computing device 304 to allow an asset manager 302 to perform and customize actions to dispose of a digital asset associated with an asset owner. The management service 308 may transmit suggested actions matched to a digital asset to the asset manager 302. The suggested actions associated trigger events and a selection of the digital assets may be customized by the asset manager 302. The suggested actions may also be processed based on regulations of a legal jurisdiction associated with the asset owner or the digital assets to comply with the regulations.

The client UI 306 may display controls to modify the suggested actions, the associated trigger events, and a selection of digital assets. The asset manager 302 may activate the controls to execute operations associated with the controls. An "authenticate" control 307 may be activated by a gesture 305 to display authentication controls. The "authenticate" control 307 may capture credentials of the asset manager 302 to authorize the asset manager 302 to access an account associated with a disposition of digital assets of an asset owner. The "authenticate" control 307 may also capture credentials of the asset owner associated with an external resource that may host digital assets of the asset owner.

A "manage actions" control 312 (upon activation) may provide additional controls to select and modify suggested actions associated with identified digital assets. An example may include a list of suggested actions that match a digital asset such as a document. The list may include a delete action, a forward action, among others. The asset manager 302 may be provided with controls to select and modify suggested actions from the list. The asset manager 302 may be allowed to configure a time period associated with an execution of actions. In an example scenario, the asset manager 302 may configure expiration time periods, which may restrict execution of operations, associated with dispositions of the digital assets to a defined time range.

The asset manager 302 may also configure recipients of the digital asset within the "manage actions" control 312. The asset manager 302 may select a number of recipients from a list provided by the asset owner. Alternatively, the asset manager 302 may also be allowed to select a number of recipients from an authorized list based on a preference of or an authorization provided to the asset manager 302.

The asset manager 302 may also customize the suggested actions based on an incapacitation type. The asset manager 302 may restrict some actions to an incapacitation type. In an example scenario, the asset manager 302 may restrict a forward action of the digital assets to a widow of the asset owner in case of a death of the asset owner identified as the incapacitation type.

A "manage trigger events" control 314 (upon activation) may provide additional controls to select and modify suggested trigger events. An example may include a list of suggested trigger events such as an incapacitation of the asset owner. The list may include a death of the asset owner, a disablement of the asset owner, an expatriation of the asset owner, a permanent relocation of the asset owner, an imprisonment of the asset owner, and a legal incapacitation declaration associated with the asset owner, among others. The asset manager 302 may be provided with controls to select and modify trigger events from the list.

A "manage digital assets" control 316 may provide the asset manager 302 with additional controls to modify a list of detected digital assets associated with the asset owner. The asset manager 302 may be provided with the additional controls to select a subset of the detected digital assets to monitor for disposition in case of a trigger event.

The digital assets may also be processed by the management service 311 to identify associated tangible assets. The tangible assets may include a bank account, a health record, and a legal document associated with the asset owner, among others. Additional suggested actions may be added to the workflow to dispose of the tangible assets. The additional suggested actions may also be processed to comply with regulations of a legal jurisdiction associated with the tangible assets or the asset owner. An example of the additional suggested actions may include transfer of the tangible assets to an executor of an estate of the asset owner.

Figure 4:
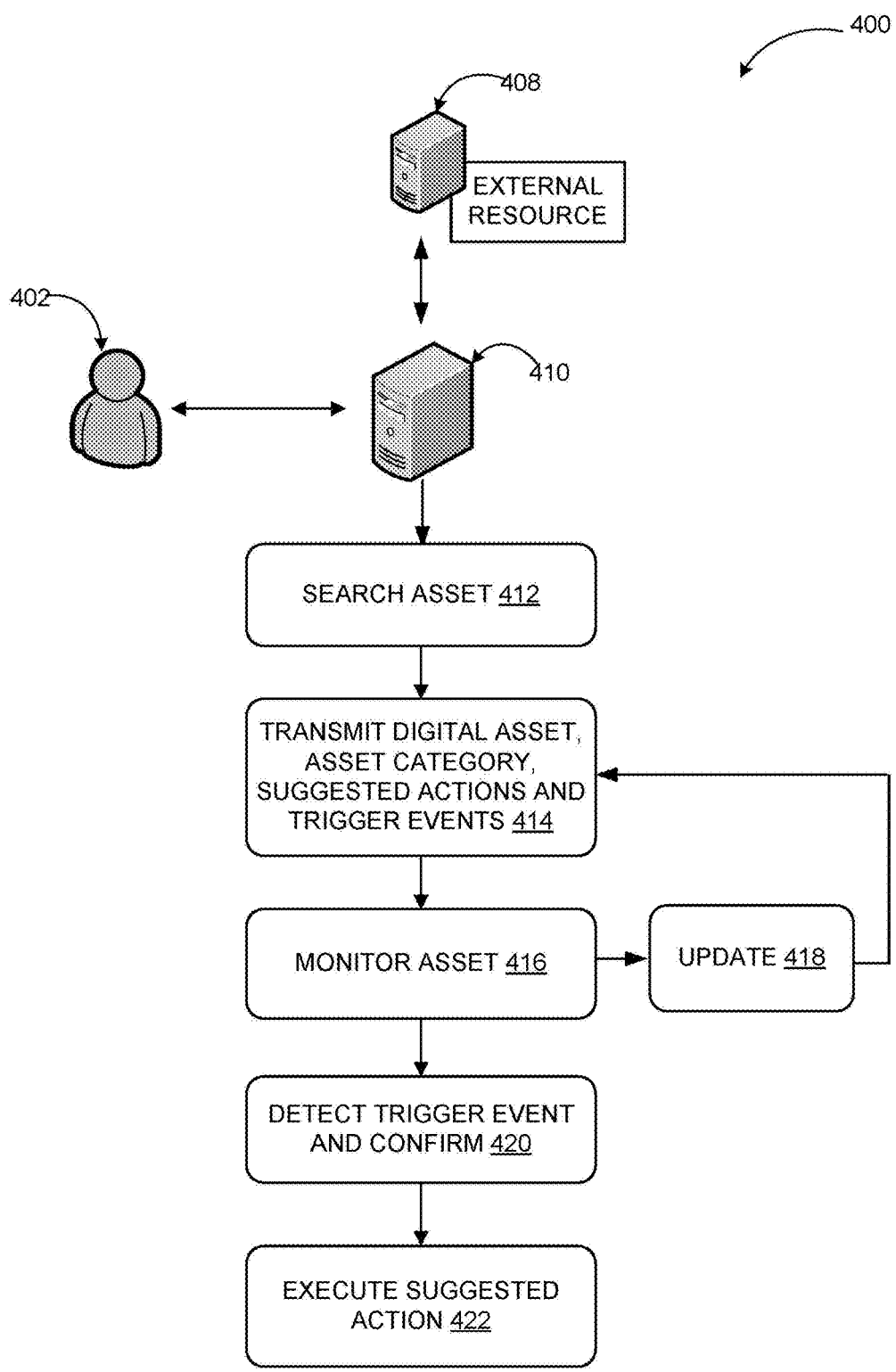
FIG. 4 is a flow diagram illustrating a management service performing digital asset management with disposition actions based on trigger events, according to embodiments.

FIG. 4 is a flow diagram illustrating a management service to perform digital asset management with disposition actions based on trigger events, according to at least some embodiments disclosed herein.

In a flow diagram 400, a management service 410 may search digital asset 412 associated with an asset owner 402. The discovery process to search the digital asset 412 may include searching an external resource 408 to discover content associated with the asset owner 402.

The management service 410 may classify the digital asset to an asset category. The digital asset and the asset category may be matched to suggested actions and suggested trigger events. For example, the management service 410 may classify the digital assets to asset categories, such as a document type, an attribute type, and an account association, among others. The categories may be based on how the document type may be handled.

An example of the asset category may include a picture classification, a document classification, a music classification, a video classification, a purchased subscription classification, a social networking account association, and a professional networking account association, among others. Another example of the asset category may include a time of creation, a location of creation, a creator of the digital asset, among others. Yet, another example of the asset category may include a sharing relation associated with the digital asset. The sharing relation may include of a family member of the asset owner 402, a friend of the asset owner 402, a colleague of the asset owner 402, and a group member associated with the asset owner 402, among others. In examples, stored data, such as pictures, may be handled differently from stored document. Also, the digital assets may be handled differently on a social networking account than on a professional networking account. The attributes may include work-related attributes, private attributes, sensitive attributes, and secret attributes. The monitoring service 410 may transmit the suggested categories, suggested monitoring, suggested trigger events, and suggested actions in response to the trigger events 414 to the asset manager.

The management service 410 may monitor 416 the digital assets. An update 418 detected to the digital assets may cause the management service 410 to reprocess the digital asset to re-identify the asset category, the suggested actions, and the suggested trigger events.

The management service 410 may detect the trigger event and confirm the trigger event 420 with the asset manager. The trigger events may include an incapacitation of the asset owner 402 detected from an information provided by the external resource 408. A notification may be transmitted to the asset manager to confirm the trigger event. In response to a confirmation by the asset manager, the suggested actions may be executed 422.

Embodiments address a need that arises from very large scale of operations created by networked computing and cloud based services that cannot be managed by humans. The actions/operations described herein are not a mere use of a computer, but address results of a system that is a direct consequence of software used as a service, such management services offered in conjunction with trigger events that indicate digital asset owner incapacitation and/or digital asset owner death. Methods include improving process security of collecting the digital assets. Additionally, methods include improving efficiency of the asset owner by allowing the asset owner to define actions to occur on the digital assets in response to trigger events.

The examples provided in FIG. 1 through FIG. 4 are illustrated with specific services, modules, and user experience configurations. Embodiments are not limited to environments according to these examples. Performing digital asset management with disposition actions based on trigger events may be implemented in environments employing fewer or additional services, modules, and user experience configurations. Furthermore, the example services, modules, and user experience configurations shown in FIG. 1 through FIG. 4 may be implemented in a similar manner with other values using the principles described herein.

Figure 5:
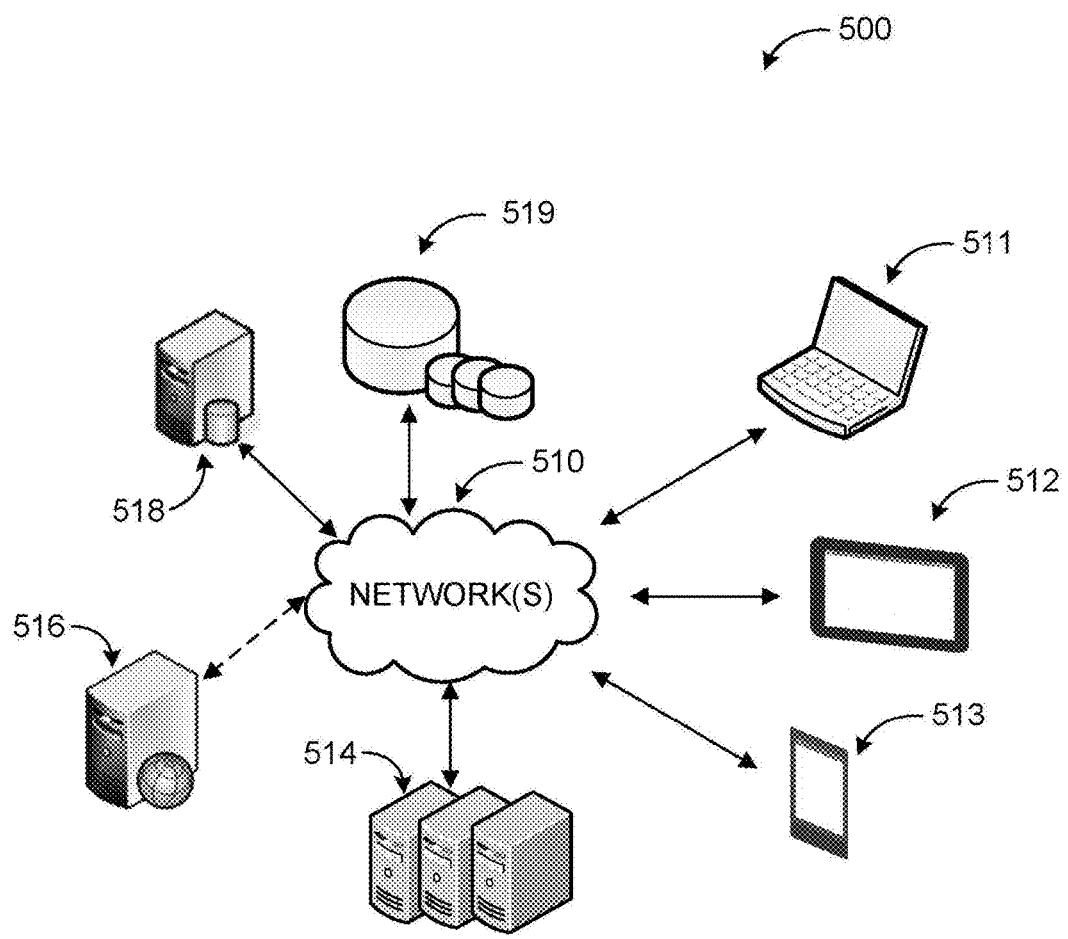
FIG. 5 illustrates a networked environment, where a system according to embodiments may be implemented.

FIG. 5 illustrates a networked environment, where a system according to embodiments may be implemented according to at least some embodiments disclosed herein.

In a networked environment 500, a management service configured to perform digital asset management with disposition actions based on trigger events may be implemented via software executed over one or more servers 514, such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A management service may transmit actions to an asset manager. The actions may include operations to dispose of digital assets of an asset owner in response to a detection of a trigger event. The management service may detect a customization or a selection of a subset of the actions by the asset manager, monitor the digital assets to detect the trigger event, detect trigger events, and execute the subset of the actions to dispose of the digital assets. The management service may store data associated with digital asset in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to perform digital asset management with disposition actions based on trigger events. Furthermore, the networked environments discussed in FIG. 5 are for illustration purposes only. Embodiments are not limited to the example applications, modules, or processes.

Figure 6:
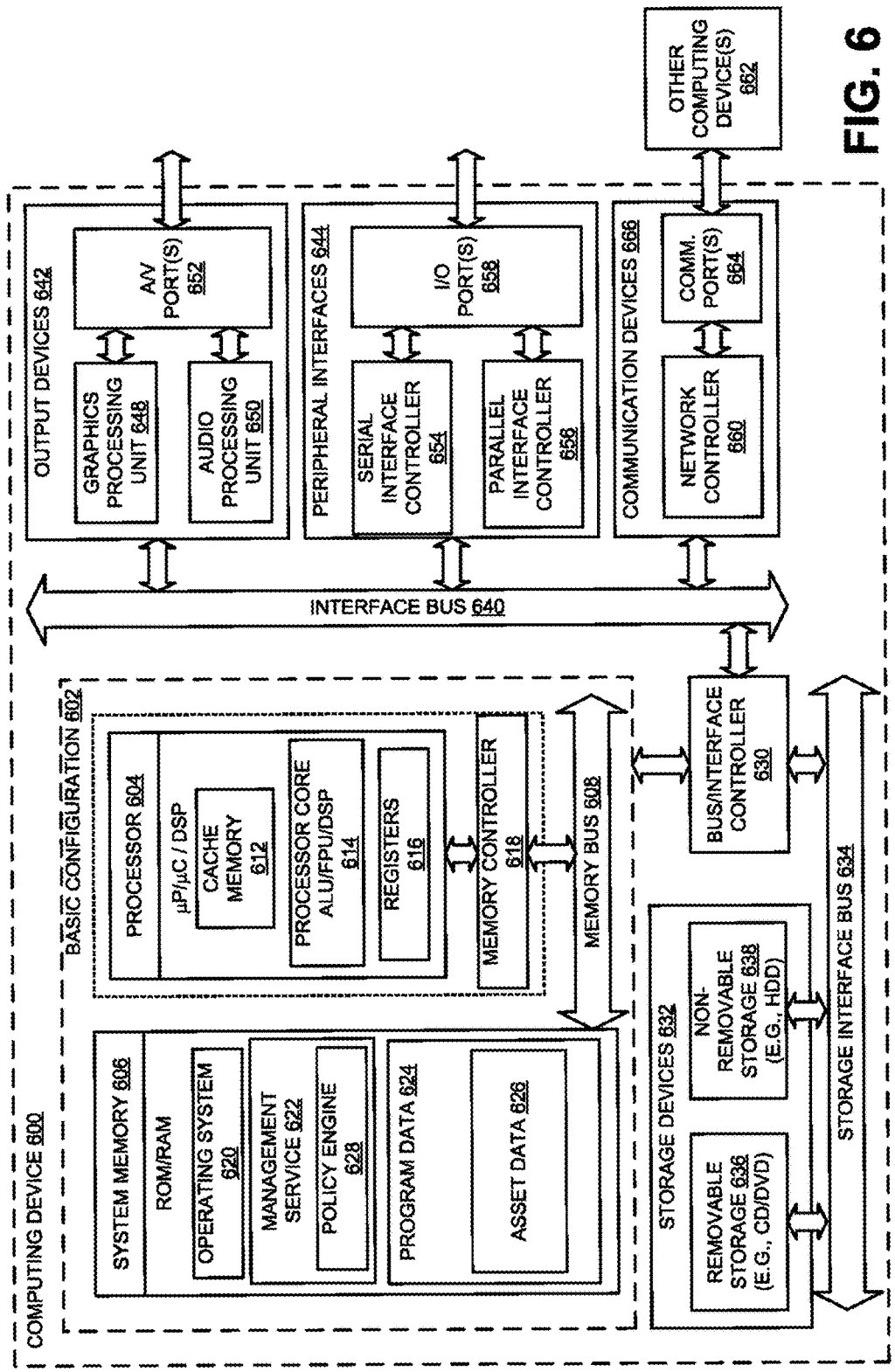
FIG. 6 illustrates a general purpose computing device, which may be configured to perform digital asset management with disposition actions based on trigger events, according to embodiments.

FIG. 6 illustrates a general purpose computing device, which may be configured to perform digital asset management with disposition actions based on trigger events, according to at least some embodiments disclosed herein.

For example, computing device 600 may be used as a server, desktop computer, portable computer, smart phone, special purpose computer, or similar device. In a basic configuration 602, the computing device 600 may include one or more processors 604 and a system memory 606. A memory bus 608 may be used for communicating between the processor 604 and the system memory 606. The basic configuration 602 is illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, processor cores 614, and registers 616. The processor cores 614 may (each) include an arithmetic logic unit (ALU), a floating point unit (FPU), a digital signal processing core (DSP Core), or any combination thereof. A memory controller 618 may also be used with the processor 604, or in some implementations the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof The system memory 606 may include an operating system 620, a management service 622, and program data 624. The management service 622 may include a policy engine 628. The policy engine 628 may include, among other things, a monitoring engine. The policy engine 628 may store an asset data 626, locally at local storage or remotely at data stores managed by the management service 622 or managed by third-party services. The monitoring engine may be configured to monitor digital asset of an asset owner. The program data 624 may include, among other data, the asset data 626. The asset data 626 may include an asset category, a suggested action, a suggested trigger event, among others.

In some examples, the management service 622 may be a management application. Components of the management application (such as a client user interface) may also be displayed on a display device. An example of the display device may include another computing device with a display component. The display device may include a touch based device that detects gestures such as a touch action. The display device may also provide feedback in response to detected gestures (or any other form of input) by transforming a client user interface of the management service 622, displayed by the touch based device.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, output devices 642, peripheral interfaces 644, and communication devices 646) to the basic configuration 602 via the bus/interface controller 630. Some of the output devices 642 include a graphics processing unit 648 and an audio processing unit 650, which may be configured to communicate to various external devices such as a display or speakers via one or more AIV ports 652. The peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more 110 ports 658. One of the communication devices 646 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Example embodiments may also include methods to perform digital asset management with disposition actions based on trigger events. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
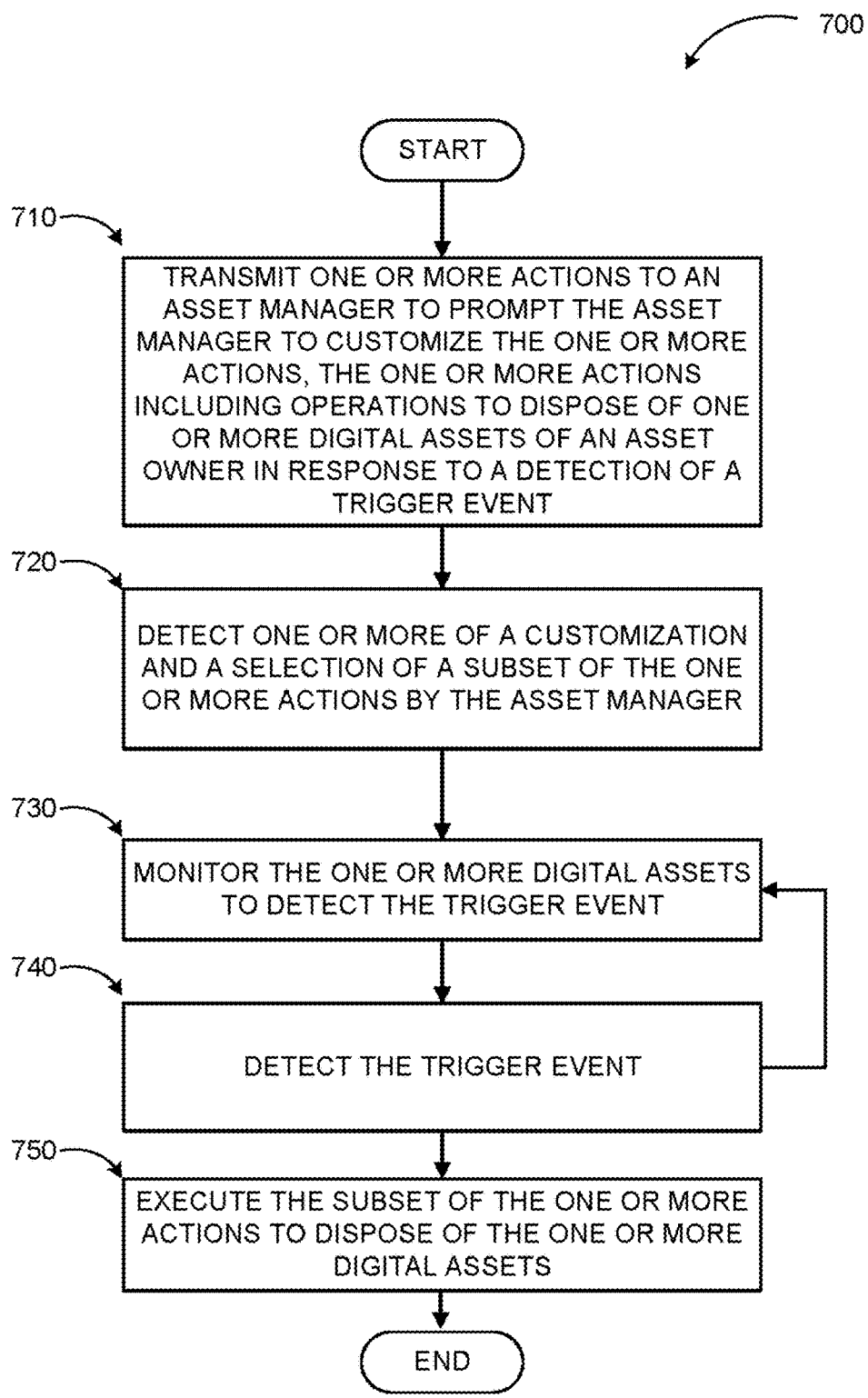
FIG. 7 illustrates an example flow diagram for a process to perform digital asset management with disposition actions based on trigger events, according to embodiments.

FIG. 7 illustrates an example flow diagram for a process to perform digital asset management with disposition actions based on trigger events, according to at least some embodiments disclosed herein.

Process 700 beings with operation 710, where actions may be transmitted to an asset manager to prompt the asset manager to customize the actions. The actions may include operations to dispose of digital assets of an asset owner in response to a detection of a trigger event. At operation 720, a customization or a selection of a subset of the actions by the asset manager may be detected. The customization may include a selection or a modification of a subset of the digital assets, asset categories, suggested trigger events, and suggested actions. At operation 730, the digital assets may be monitored to detect the trigger event. The trigger event may be detected at operation 740. At operation 750, the subset of the actions may be executed to dispose of the digital assets.

Some or all of the operations of the process 700 may be reprocessed with feedback operations. In an example scenario, the trigger event detected in the operation 740 may be used as an input in the operation 730 to monitor related digital assets. The related digital assets may include the trigger event. Other feedback loops may be used with other operations of the process 700 to customize operations of the process 700, among other things.

The operations included in process 700 are for illustration purposes. A management service according to embodiments may be implemented by similar processes with fewer or additional steps, as well as in different order of operations using the principles described herein.

According to some examples a computing device to perform disposition actions in digital asset management based on trigger events may be described. The computing device may include a memory configured to store instructions associated with a management service and one or more processors coupled to the memory. The one or more processors may execute the management service in conjunction with instructions stored in the memory. The management service may include a monitoring engine configured to monitor one or more digital assets of an asset owner to detect a trigger event. The computing device may further include a policy engine configured to transmit one or more actions to an asset manager to prompt the asset manager to customize the one or more actions, where the one or more actions include operations to dispose of the one or more digital assets in response to the detection of the trigger event, detect one or more of a customization and a selection of a subset of the one or more actions by the asset manager, receive an indication of the detection of the trigger event from the monitoring engine, and execute the subset of the one or more actions to dispose of the one or more digital assets.

According to other examples, the policy engine may be further configured to identify one or more of the asset owner, a legal representative of the asset owner, an authorized family member of the asset owner, an authorized relation of the asset owner, and a colleague of the asset owner as the asset manager. The policy engine may be further configured to forward the one or more assets to the asset manager in response to an execution of the subset of the one or more actions. The policy engine may be further configured to publish an incapacitation announcement associated with the asset owner for a time period on one or more of a social networking account and a professional networking account of the asset owner in response to the detection of the trigger event. The policy engine may be further configured to delete the social networking account and the professional networking account of the asset owner in response to an expiration of the time period. The policy engine may be further configured to suspend the social networking account and the professional networking account of the asset owner and delete the one or more digital assets in response to an expiration of the time period.

According to further examples, the policy engine may be further configured to modify one or more of: the subset of the one or more actions and categories associated with the one or more digital assets. The policy engine may be further configured to detect an input by the asset manager to dispose of the one or more digital assets, where the input is identified as the trigger event. The policy engine may be further configured to detect a delegation action by the asset manager to authorize one or more of the asset owner, a legal representative of the asset owner, an authorized family member of the asset owner, an authorized relation of the asset owner, and a colleague of the asset owner to dispose of the one or more digital assets through a delegated input as the trigger event. The policy engine may be further configured to transmit a request to the asset manager to prompt the asset manager to provide a confirmation of the trigger event and in response to the confirmation, execute the subset of the one or more actions.

According to some examples, a method executed on a computing device to perform disposition actions in digital asset management based on trigger events may be described. The method may include transmitting one or more actions to an asset manager to prompt the asset manager to customize the one or more actions, where the one or more actions include operations to dispose of one or more digital assets of an asset owner in response to a detection of a trigger event, detecting one or more of a customization and a selection of a subset of the one or more actions by the asset manager, monitoring the one or more digital assets to detect the trigger event, detecting the trigger event, where the trigger event is based on an incapacitation type of the asset owner, and executing the subset of the one or more actions to dispose of the one or more digital assets.

According to other examples, the method may further include transmitting the incapacitation type to the asset manager to allow the asset manager to customize one or more of the subset of the one or more actions and the incapacitation type. The method may further include identifying the incapacitation type as an expatriation of the asset owner and removing the one or more digital assets. The method may further include identifying the incapacitation type as an expatriation of the asset owner and transferring the one or more digital assets to one or more of the asset owner, a legal representative of the asset owner, an authorized family member of the asset owner, an authorized relation of the asset owner, the asset manager, and a colleague of the asset owner. The method may further include prompting the asset manager to review the one or more digital assets based on the incapacitation type of the asset owner. The method may further include monitoring the one or more digital assets to detect a change to the one or more digital assets, where the change to the one or more digital assets includes one or more of: an update of the one or more digital assets, an addition of a new digital asset to the one or more digital assets, and a removal of an existing digital asset from the one or more digital assets and providing the asset manager with one or more of an alert and a report in response to a detection of the change to the one or more digital assets.

According to some examples, a computer-readable memory device with instructions stored thereon to perform disposition actions in digital asset management based on trigger events may be described. The instructions may include actions that are similar to the method described above.

According to some examples a means to perform disposition actions in digital asset management based on trigger events may be described. The means to perform disposition actions in digital asset management based on trigger events may include a means to transmit one or more actions to an asset manager to prompt the asset manager to customize the one or more actions, where the one or more actions include operations to dispose of the one or more digital assets in response to the detection of the trigger event, a means to detect one or more of a customization and a selection of a subset of the one or more actions by the asset manager, a means to monitor one or more digital assets of an asset owner to detect a trigger event, a means to receive an indication of the detection of the trigger event from the monitoring engine, and a means to execute the subset of the one or more actions to dispose of the one or more digital assets.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to perform disposition actions in digital asset management based on trigger events, the computing device comprising:
    a memory configured to store instructions associated with a management service;
    one or more processors coupled to the memory, wherein the one or more processors executing the management service in conjunction with instructions stored in the memory, are configured to:
        monitor one or more digital assets of an asset owner to detect a trigger event, wherein the trigger event is based on an incapacitation type of the asset owner;
        transmit a list of suggested actions to an asset manager, wherein the suggested actions include operations to dispose of the one or more digital assets, through the user interface on the computing device, in response to the detection of the trigger event;
        provide one or more controls to the asset manager to modify the suggested actions, through the user interface on the computing device, based on the incapacitation type of the asset owner, wherein the incapacitation type includes one of: an expatriation of the asset owner, the asset owner entering into a witness protection program, an indication of a stolen identity of the asset owner, a name change of the asset owner, an imprisonment of the asset owner, and a legal incapacitation declaration associated with the asset owner;
        receive a modification to one or more suggested actions from the asset manager through the user interface; and
        perform the modified one or more actions to dispose of the one or more digital assets.

2. The computing device of claim 1, wherein the one or more processors are further configured to:
    identify one or more of the asset owner, a legal representative of the asset owner, an authorized family member of the asset owner, an authorized relation of the asset owner, and a colleague of the asset owner as the asset manager.

3. The computing device of claim 1, wherein the one or more processors are further configured to
    forward the one or more digital assets to the asset manager in response to a performance of the modified one or more actions.

4. The computing device of claim 1, wherein the one or more processors are further configured to:
    in response to the detection of the trigger event, publish an incapacitation announcement associated with the asset owner for a time period on one or more of a social networking account and a professional networking account of the asset owner.

5. The computing device of claim 4, wherein the one or more processors are further configured to:
    in response to an expiration of the time period, delete the social networking account and the professional networking account of the asset owner.

6. The computing device of claim 4, wherein the one or more processors are further configured to:
    in response to an expiration of the time period, suspend the social networking account and the professional networking account of the asset owner and delete the one or more digital assets.

7. The computing device of claim 1, wherein the one or more processors are further configured to:
    modify the one or more categories associated with the one or more digital assets.

8. The computing device of claim 1, wherein the one or more processors are further configured to:
    detect an input by the asset manager to dispose of the one or more digital assets, wherein the input is identified as the trigger event.

9. The computing device of claim 1, wherein the one or more processors are further configured to:

detect a delegation action by the asset manager to authorize one or more of the asset owner, a legal representative of the asset owner, an authorized family member of the asset owner, an authorized relation of the asset owner, and a colleague of the asset owner to dispose of the one or more digital assets through a delegated input as the trigger event.

10. The computing device of claim 1, wherein the one or more processors are further configured to:
transmit a request to the asset manager to prompt the asset manager to provide a confirmation of the trigger event; and
in response to the confirmation, perform the modified one or more actions.

11. A method executed on a computing device to perform disposition actions in digital asset management based on trigger events, the method comprising:
monitoring one or more digital assets of an asset owner to detect a trigger event, wherein the trigger event is based on an incapacitation type of the asset owner;
transmitting a list of suggested actions, wherein the suggested actions include operations to dispose of one or more digital assets of an asset owner in response to the detection of the trigger event;
providing one or more controls to the asset manager for modifying the suggested actions based on the incapacitation type of the asset owner, wherein the incapacitation type includes one of: an expatriation of the asset owner, the asset owner entering into a witness protection program, an indication of a stolen identity of the asset owner, a name change of the asset owner, an imprisonment of the asset owner, and a legal incapacitation declaration associated with the asset owner;
receiving a modification to the one or more suggested selected or modified actions from the asset manager; and
performing the modified one or more actions to dispose of the one or more digital assets.

12. The method of claim 11, further comprising:
identifying the incapacitation type as an expatriation of the asset owner; and
removing the one or more digital assets.

13. The method of claim 11, further comprising:
identifying the incapacitation type as an expatriation of the asset owner; and
transferring the one or more digital assets to one or more of the asset owner, a legal representative of the asset owner, an authorized family member of the asset owner, an authorized relation of the asset owner, the asset manager, and a colleague of the asset owner.

14. The method of claim 11, further comprising:
prompting the asset manager to review the one or more digital assets based on the incapacitation type of the asset owner.

15. The method of claim 11, further comprising:
monitoring the one or more digital assets to detect a change to the one or more digital assets, wherein the change to the one or more digital assets includes one or more of: an update of the one or more digital assets, an addition of a new digital asset to the one or more digital assets, and a removal of an existing digital asset from the one or more digital assets.

16. The method of claim 15, further comprising:
providing the asset manager with one or more of an alert and a report in response to a detection of the change to the one or more digital assets.

17. A computer-readable memory device with instructions stored thereon to perform disposition actions in digital asset management based on trigger events, the instructions comprising:
monitoring one or more digital assets of an asset owner to detect a trigger event, wherein the trigger event is based on an incapacitation type of the asset owner;
transmitting a list of suggested actions to an asset manager, wherein the suggested actions include operations to dispose of one or more digital assets of an asset owner in response to the detection of the trigger event;
providing one or more controls to the asset manager for modifying the suggested actions based on the incapacitation type of the asset owner, wherein the incapacitation type includes one of: an expatriation of the asset owner, the asset owner entering into a witness protection program, an indication of a stolen identity of the asset owner, a name change of the asset owner, an imprisonment of the asset owner, and a legal incapacitation declaration associated with the asset owner;
receiving a modification to one or more suggested modified actions from the asset manager, wherein the asset manager includes one or more of the asset owner, a legal representative of the asset owner, an authorized family member of the asset owner, an authorized relation of the asset owner, and a colleague of the asset owner; and
performing the modified one or more actions to dispose of the one or more digital assets.

18. The computer-readable memory device of claim 17, wherein the instructions further comprise:
in response to a detection of the trigger event, publishing an incapacitation announcement associated with the asset owner for a time period on one or more of a social networking account and a professional networking account of the asset owner; and
in response to an expiration of the time period, suspending the social networking account and the professional networking account of the asset owner and deleting the one or more digital assets.

19. The computer-readable memory device of claim 17, wherein the instructions further comprise:
monitoring the one or more digital assets to detect a change to the one or more digital assets, wherein the change to the one or more digital assets includes one or more of: an update of the one or more digital assets, an addition of a new digital asset to the one or more digital assets, and a removal of an existing digital asset from the one or more digital assets; and providing the asset manager with one or more of an alert and a report in response to the change to the one or more digital assets.

* * * * *